(12) United States Patent
Glebov et al.

(10) Patent No.: US 7,324,286 B1
(45) Date of Patent: Jan. 29, 2008

(54) OPTICAL BEAM STEERING AND SWITCHING BY OPTICALLY CONTROLLED LIQUID CRYSTAL SPATIAL LIGHT MODULATOR WITH ANGULAR MAGNIFICATION BY HIGH EFFICIENCY PTR BRAGG GRATINGS

(75) Inventors: Leonid B Glebov, Orlando, FL (US); Vasile Rotar, Orlando, FL (US); Vadim I Smirnov, Orlando, FL (US); Sarik Nersisyan, Winter Park, FL (US); Nelson Tabirian, Winter Park, FL (US)

(73) Assignee: University of Central Florida Research Foundation, Orlando, FL (US)

( * ) Notice: Subject to any disclaimer, the term of this patent is extended or adjusted under 35 U.S.C. 154(b) by 0 days.

(21) Appl. No.: 11/399,166

(22) Filed: Apr. 6, 2006

Related U.S. Application Data (63) Continuation-in-part of application No. 11/261,077, filed on Oct. 28, 2005, which is a continuation-in-part of application No. 10/665,339, filed on Sep. 19, 2003, which is a continuation-in-part of application No. 09/750,708, filed on Dec. 28, 2000, now Pat. No. 6,673,497, which is a continuation-in-part of application No. 09/648,293, filed on Aug. 24, 2000, now Pat. No. 6,586,141, said application No. 11/261,077.

(60) Provisional application No. 60/779,687, filed on Mar. 6, 2006, provisional application No. 60/623,889, filed on Nov. 1, 2004, provisional application No. 60/174,432, filed on Jan. 4, 2000.

(51) Int. Cl.
*G02B 3/00* (2006.01)
*G02B 9/00* (2006.01)

(52) U.S. Cl. .......... 359/652; 359/30; 359/618; 359/634

(58) Field of Classification Search .......... 359/652
See application file for complete search history.

(56) References Cited

U.S. PATENT DOCUMENTS 6,586,141 B1 * 7/2003 Efimov et al. .......... 430/1

(Continued)

OTHER PUBLICATIONS

L.B. Glebov, V.I.Smirnov, C.M. Stickley, I.V. Ciapuin, "New Approach to Robust Optics for HEL Systems", Laser Weapons Technology III, W.E. Tompson and P.H. Merritt, Editors, Proceedings of SPIE, 4724 (2002) pp. 101-109.

(Continued)

*Primary Examiner*—Jessica T Stultz
(74) *Attorney, Agent, or Firm*—Brian S. Steinberger; Phyllis K. Wood; Law Offices of Brian S. Steinberger, P.A.

(57) ABSTRACT

Non-mechanical optical beam steering and switching is produced by optically controlled liquid crystal spatial light modulator with angular magnification by high efficiency volume Bragg gratings recorded in a photosensitive PTR glass. Small angle beam deflection in a photoactive liquid crystal cell is produced by exposing it to a controlling beam from an external source of radiation with predetermined distribution of power density which causes predetermined spatial gradients of a refractive index in a liquid crystal cell and, therefore, refraction of a controlled beam which is made to propagate in the region with spatial gradient of the refractive index. Large angle beam deflection is produced by a volume Bragg grating with angular selectivity adjusted in such way that small angle scanning produced by optically controlled liquid crystal spatial light modulator results in change of diffraction efficiency from zero to 100% for switching the beam for two Bragg angles.

18 Claims, 8 Drawing Sheets

U.S. PATENT DOCUMENTS

| | | | |
|---|---|---|---|
| 6,673,497 B2 * | 1/2004 | Efimov et al. | 430/1 |
| 6,687,036 B2 * | 2/2004 | Riza | 359/204 |
| 6,912,073 B2 * | 6/2005 | Wildeman et al. | 359/3 |
| 2004/0196556 A1 * | 10/2004 | Cappiello | 359/569 |

OTHER PUBLICATIONS

Paul F. McManamon, Jianru Shi, and Philip J. Bos. "Broadband Optical Phased-array Beam Steering", Optical Engineering 44 (2005) 128004, pp. 1-5.

P.F. McManamon and E.A. Watson, "Nonmechanical Beam Steering for Passive Sensors", in Proc. SPIE 4369, (2001) pp. 140-148.

Igor V. Ciapurin, Leonid B. Glebov, Vadim I. Smirnov, "Modeling of Phase Volume Diffractive Gratings, Part 1: Transmitting Sinusoidal Uniform Gratings", Optical Engineering 45 (2006) 015802, pp. 1-9.

* cited by examiner

OPTICAL BEAM STEERING AND SWITCHING BY OPTICALLY CONTROLLED LIQUID CRYSTAL SPATIAL LIGHT MODULATOR WITH ANGULAR MAGNIFICATION BY HIGH EFFICIENCY PTR BRAGG GRATINGS

This application is a Continuation-In-Part of U.S. patent application Ser. No. 11/261,077 filed on Oct. 28, 2005, which is a Continuation-In-Part of U.S. patent application Ser. No. 10/665,339 filed Sep. 19, 2003, which is a Continuation-In-Part of U.S. patent application Ser. No. 09/750,708 filed Dec. 28, 2000, now U.S. Pat. No. 6,673,497 issued on Jan. 6, 2004, which is a Continuation-In-Part of U.S. patent application Ser. No. 09/648,293 filed on Aug. 24, 2000, now U.S. Pat. No. 6,586,141 which claimed priority from U.S. Provisional Application Ser. No. 60/174,432 filed Jan. 4, 2000, by the same assignee as that of the subject invention, and U.S. patent application Ser. No. 11/261,077 futher claims the benefit of priority from U.S. Provisional Application Ser. No. 60/623,889 filed on Nov. 01, 2004 and was funded by the DoD/DARPA Contract HR-01-1041-0004; and the current application also claims the benefit of priority to U.S. Provisional Application No. 60/779,687 filed on Mar. 6, 2006 and was funded in part by DoD contracts F33615-02-C-1250 (DARPA) and HR-01-1041-0004 (DARPA), DoD contract W31P4Q-04-C-R157 (DARPA) and DoD contract W31P4Q-04-C-R026 (DARPA).

FIELD OF THE INVENTION

This invention relates to optical beam control and, in particular, to methods, systems, apparatus and devices for fast steering and switching of optical beams, including laser beams, for large angles with no movable parts used for switching in optical interconnectors, multichannel laser systems, beam scanners, pointers, target trackers, etc.

BACKGROUND AND PRIOR ART

U.S. Pat. Nos. 6,586,141 and 6,673,497 issued to Efimov et al. on Jul. 1, 2003 and Jan. 6, 2004, respectively, teach how to make diffractive optical elements from photosensitivity photo-thermo-refractive (PTR) glass with efficiency exceeding 95% and use of such elements, which are implied as volume Bragg gratings produced by interference of collimated beams, for angular and spectral beam transformations. These elements are spatial filter, attenuator, beam splitter, beam sampler, beam deflector controlled by angular positioning of grating or spectral scanning of the incident beam, selector of particular wavelengths, also known as notch filter or add/drop element, spectral shape former, also known as gain equalizer, spectral sensor, also known as wavelocker or wavelength meter, angular sensor, also known as angular pointer, Bragg spectrometer, also known as spectral analyzer, and selectors of transverse and longitudinal modes in laser resonators. All these diffractive optical elements are based on the use of specific angular and spectral selectivity of Bragg gratings.

A known use for such gratings is described in Igor V. Ciapurin, Leonid B. Glebov, Vadim I. Smirnov, Modeling of phase volume diffractive gratings, part 1: transmitting sinusoidal uniform gratings, Optical Engineering 45 (2006) 015802, pp. 1-9 for modeling of spectral and angular selectivity of transmitting gratings. It was shown that spectral and angular selectivity of Bragg gratings could be controlled by proper selection of their basic parameters which are spatial frequency, refractive index modulation, and thickness. The range of variations of Bragg gratings parameters, spectral or angular selectivity, is very wide and covers almost all requirements of different optical and laser systems.

A prior art Universal Beam controller is described in P. F. McManamon and E. A. Watson, "Nonmechanical beam steering for passive sensors," in Proc. SPIE 4369, (2001) pp. 140-148 and Paul F. McManamon, Jianru Shi, and Philip J. Bos. Broadband optical phased-array beam steering. Optical Engineering 44 (2005) 128004, pp. 1-5 which describes an approach based on the use of a sequence of optical phased array (OPAs) for zone selection, a stack of PTR Bragg gratings for zone pointing, and one more OPAs for zone filling. The device described is based on creation of a thin phase grating with variable period in an electrically controlled liquid crystal phased array. This OPA produces small angle deflection by changing a period of a thin grating by re-arrangement of voltage.

The closest prior art to the present invention is a Universal Beam controller described in Paul F. McManamon, Jianru Shi, and Philip J. Bos. Broadband optical phased-array beam steering. Optical Engineering 44 (2005) 128004, pp. 1-5 which uses a sequence of optical phased arrays for zone selection, a stack of PTR Bragg gratings for zone pointing, and one more optical phased arrays for zone filling. The device described is based on creation of a thin phase grating with variable period in an electrically controlled LC phased array. This optical phased array produces small angle deflection by changing a period of a thin grating by re-arrangement of voltage.

SUMMARY OF THE INVENTION

A primary objective of the invention is to provide new apparatus, methods, systems, and devices to use optically controlled SLM which does not require applying voltage but can be controlled remotely by an external laser source to provide significantly higher robustness and higher switching rates for laser beam control.

A secondary objective of the invention is to provide new apparatus, methods, systems, and devices for optical beam steering and switching by optically controlled liquid crystal spatial light modulator with angular magnification by high efficiency PTR Bragg gratings.

A third objective of the invention is to provide new apparatus, methods, systems and devices to provide high quality of a deflected beam with high rate of switching and absence of nonlinear distortions.

A fourth objective of the invention is to provide new apparatus, methods, systems and devices to enable fast steering and switching of optical (including laser) beams for large angles with no movable parts in the whole device.

A fifth objective of the invention is to provide new apparatus, methods, systems and devices with photosensitivity and phase modulating function integrated into a single layer of an LC-material in optically controlled liquid crystal spatial light modulator that is produced for a fraction of a conventional liquid crystal spatial light modulator.

A sixth objective of the invention is to provide new apparatus, methods, systems and devices optical beam steering and switching for applications such as optical beam switching between channels in any type of multi-channel optical devices and for precise beam steering in any type of laser scanner including high power laser systems.

In a first embodiment, the optical device includes a liquid crystal layer sandwiched between a first and a second substrate, a first laser source for providing a controlled beam that is focused at the liquid crystal layer, a second laser source for providing a controlling beam at a controlling wavelength, and a lens for aligning the controlling beam having a controlling wavelength in an area of highest gradient power density of the controlling beam on the liquid crystal layer, wherein an e-component of the controlled beam is deflected by a gradient refractive index and birefringence induced by the controlling beam to provide optically controlled beam switching for laser beam control. The device also includes a collimator for collimating the controlled beam after the controlled beam passes through the liquid crystal layer, and a volume Bragg grating recorded in a photosensitive PTR glass for angular magnification of the collimated controlled beam to decrease a switching time, wherein the collimated controlled beam is directed to the volume Bragg gratings so that the collimated controlled beam is not diffracted.

A second embodiment provides a system for optical beam steering and switching that includes an optically controlled liquid crystal spatial light modulator, a first laser source for providing a controlled beam that is focused at the optically controlled liquid crystal spatial light modulator, a second laser source for providing a controlling beam, and a lens for aligning the controlling beam in an area of highest gradient power density of the controlling beam on the optically controlled liquid crystal spatial light modulator for optically controlled optical beam steering and switching. The optically controlled spatial light modulator includes a liquid crystal layer sandwiched between a first and a second substrate, wherein an e-component of the controlled beam is deflected by a gradient refractive index and birefringence induced by the controlling beam and the photosensitivity and phase modulating functions are integrated into a liquid crystal material in the optically controlled liquid crystal spatial light modulator.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

| 10 | conventional LC-SLM structure |
|----|-------------------------------|
| 12 | electrode |
| 14 | photosensitive semiconductor |
| 16 | substrate |
| 18 | liquid crystal |
| 20 | OCLC SLM structure |
| 30 | controlling beam |
| 32 | controlling lens |
| 35 | liquid crystal |
| 40 | controlled beam |
| 42 | controlled lens |
| 44 | collimator |
| 46 | collimated controlled beam |
| 50 | PTR Bragg grating |
| 60 | OCLC SLM |

The apparatus, methods, systems and devices of the present invention use high efficiency volume diffractive gratings in photosensitive material, particularly in PTR glass, for angular magnification in combination with optically controlled liquid crystal spatial light modulators (OCLC SLM). OCLC SLMs have several distinct advantages compared to electrically controlled liquid crystal spatial light modulators (LC SLM). The photosensitivity and phase modulating functions are integrated into a single layer of an LC-material in OCLC SLM. The resulting apparatus is produced for a fraction of the cost required to produce a conventional LC-SLM and the OCLC SLM can be used with high power laser radiation due to high transparency of LC materials and absence of light absorbing electrodes on the substrates of the LC-cell constituting the OCLC SLM.

Figure 1A:
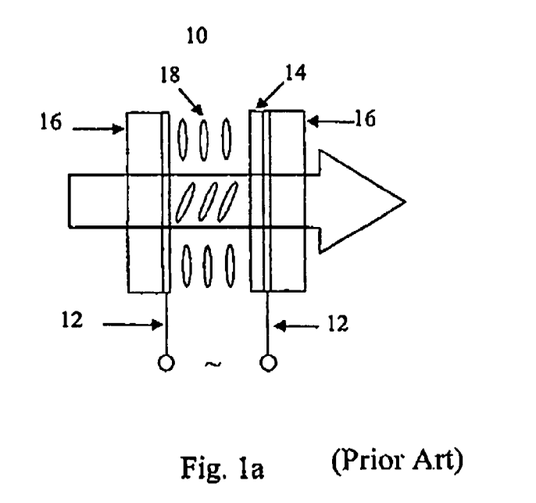
FIG. 1a shows the structure of a conventional liquid crystal-SLM having electrodes and a photosensitive semiconductor.

In contrast, electrically controlled LC SLM 10 shown in FIG. 1a are complex multi-layer systems where an electric field provided by an external power supply modulates the optical axis direction of a thin layer of a LC according to the intensity pattern of the light propagating through it. The sensitivity to the light is achieved by adding a photosensitive semiconductor layer 14 onto one of the substrates 16 sandwiching the liquid crystal-film 18. The substrates 16 include electrodes 12 for application of the electric voltage to the liquid crystal 18 as shown in FIG. 1a. Absorption of radiation in photosensitive semiconductors 14 and even in thin ITO coatings of substrates used in conventional LC SLM 10 limits their use to low power laser beams only.

The apparatus, methods, systems and devices of the present invention provide large angle steering and switching. First, deflection of a beam for a small angle is produced by generation of refractive index spatial gradient in a liquid crystal LC cell resulted from illumination with an optical beam at a controlling wavelength. Deflection for small angles allows the use of thin LC cells which enable short time of switching. The angle of deflection is chosen in such way that it corresponds to angular separation between maximum and minimum of diffraction efficiency of volume Bragg grating (VBG). This results in deflection of the beam for a doubled Bragg angle which can be orders of magnitude larger compared to the initial deflection by the LC cell. An additional LC cell can be used to provide fine tuning of the beam position in the vicinity of a deflection point produced by VBG.

Figure 1B:
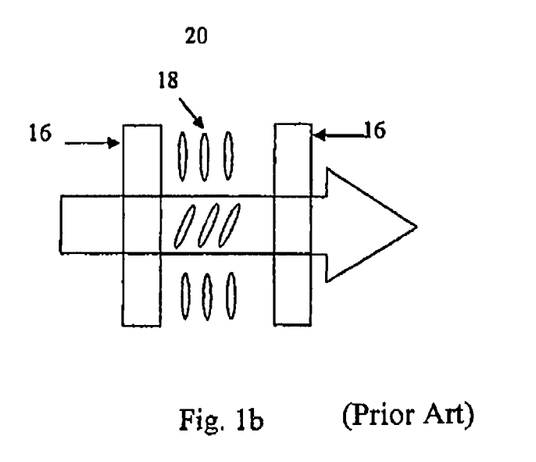
FIG. 1b shows reorientation of liquid crystal of a conventional liquid crystal-SLM without electrodes and photo-semiconductor.

Illumination of liquid crystal with radiation causes reorientation of liquid crystal as shown in FIGS. 1a and 1b. FIG. 1a shows the structure of a prior art electrically controlled liquid crystal spatial light modulator 10 that uses electrodes 12 and a photosensitive semiconductor 14 for reorienting the liquid crystal 18 as previously described. FIG. 1b shows reorientation of the liquid crystal 18 in an all-optical spatial light modulator 20 that does not require the use of electrodes for application of an electric field and does not require photo-semiconductor for sensing the optical radiation. This effect is particularly strong in particular types of liquid crystals and in liquid crystals containing trace amounts of particular dopants. The sensitivity of liquid crystal reorientation to optical radiation depends on the wavelength and orientation of polarization in regard to orientation of the liquid crystal molecules in the cell. This phenomenon of photo induced reorientation can dramatically change its refractive index if the wavelength and direction of polarization of the exciting radiation is properly chosen.

Figure 2A:
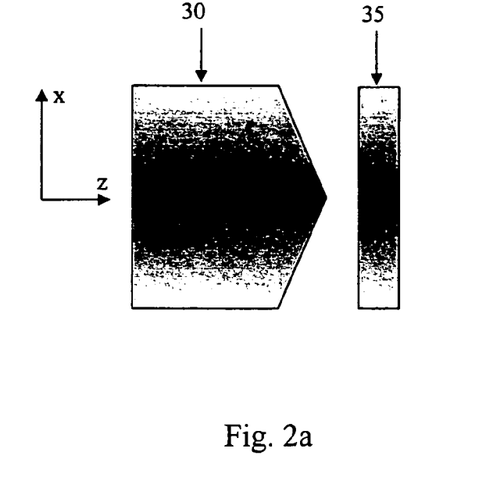
FIG. 2a shows the spatial distribution of refractive index variation which depends on distribution of power density in an exciting beam.
Figure 2B:
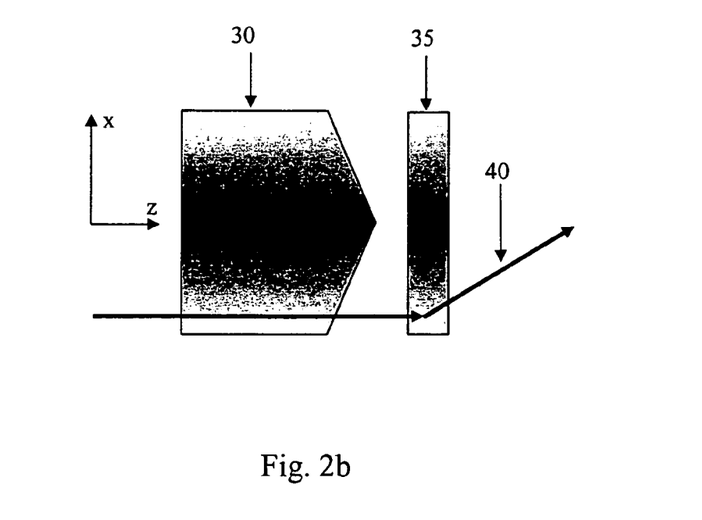
FIG. 2b shows deflection of a controlled beam by refractive index gradient in a LC cell induced by a non-uniform distribution of power density in a controlled beam.

Spatial distribution of refractive index 35 variation depends on distribution of power density in an controlling exciting beam 30 as shown in FIG. 2a. A wavelength and direction of polarization of the second beam 40 is selected that would not change a refractive index of the liquid crystal 35. This means that illumination of the same cell 35 by the controlling optical beam 30 does not produce additional changes in the cell. However, refractive index of LC cell 35 would be different in different sections of the second controlled beam 40 as shown in FIG. 2b. Therefore, the liquid crystal device 35 functions as a prism for the second controlled beam 40 and therefore deflects the second beam 45 as demonstrated in the right part of FIG. 2b. In this case, the first beam is a controlling beam 30 while the second beam is a controlled one 40.

Figure 3:
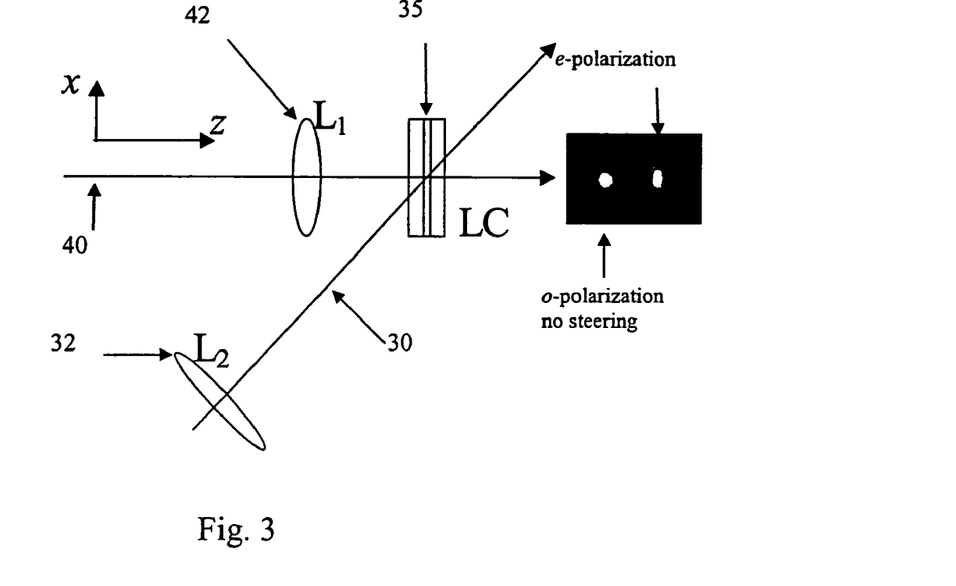
FIG. 3 shows an example of photo-induced deflection of an optical beam.

An example of this approach is shown in FIG. 3. A controlled unpolarized beam 40 ($\lambda$=633 nm; P=20 mW, W=0.6 mm at the level of 1/e2) is focused toward a LC cell 35 by a lens 42 with f=60 mm in a spot of 18.5 µm in diameter. This controlled beam 40 passes the LC cell 35 without deflection. A controlling polarized beam 30 having a wavelength $\lambda$=1064 nm, power P=20 W, W=2.5 mm at the level of 1/e2 for example, is launched to the same LC cell 35 and is focused by a lens 32 with focal length f=1000 mm in a spot of 135 µm in diameter. These spots are aligned such that a controlling beam 30 is placed in the area of highest gradient of power density of the controlling beam 30. A gradient of refractive index and birefringence induced by the controlling beam 30 results in deflection of an e-component of the controlled beam 40.

Figure 4:
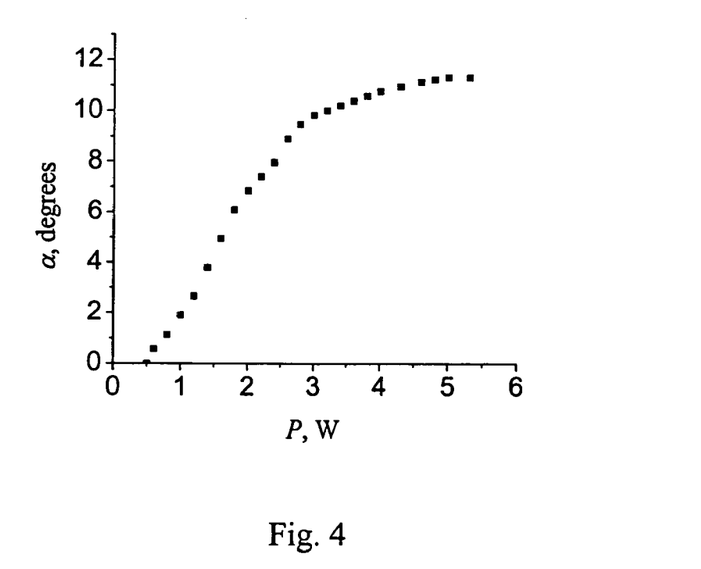
FIG. 4 shows a graph of the dependence of deflection of a controlled beam on power of a controlling beam.

The dependence of the deflection angle of the controlled beam 40 on power of a controlling beam 30 is shown in FIG. 4. The deflection angle is efficiently controlled by the power of the controlling beam. As shown on the graph of FIG. 4, at the high power of the controlling beam the deflection angle $\alpha$ approaches its maximum value. Maximum deflection angle achieved for this example is approximately 12°. However, this value is achieved for an extremely thick LC cell of about 250 µm. This results in a switching time of a few minutes. To eliminate this problem, angular magnification by PTR Bragg gratings is used.

Figure 5:
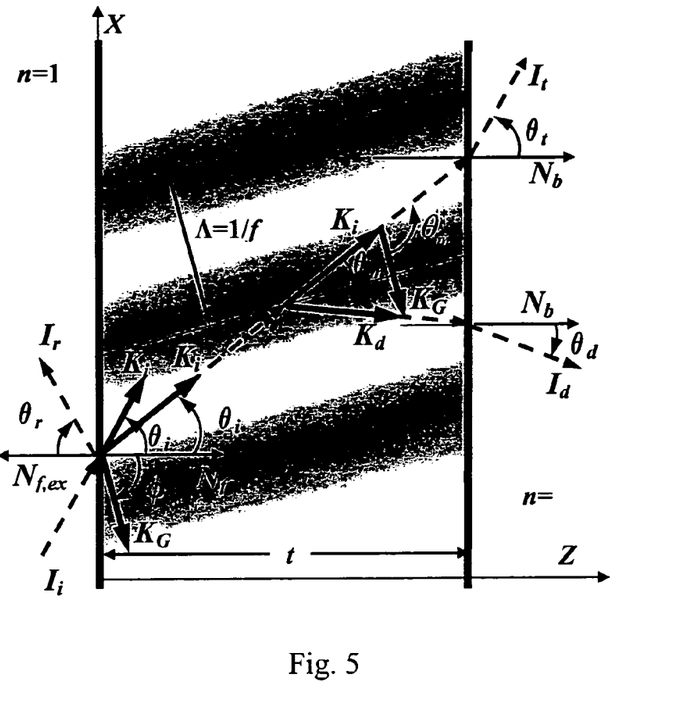
FIG. 5 shows designations of angles and vectors for volume Bragg ratings.

Designations of angles and vectors for volume Bragg grating recorded in a plane-parallel plate are shown in FIG. 5. Deflection of a beam by a grating is $\theta_D = \theta_i + \theta_d$. First, a symmetric transmitting grating with a grating vector in the plane of drawing (azimuth $\phi$=90°, elevation $\epsilon$=0°) are used. Producing a deflection angle $\theta_D = 2\theta_d = 2\theta_i$. As described in Igor V. Ciapurin, Leonid B. Glebov, Vadim I. Smirnov, Modeling of phase volume diffractive gratings, part 1: transmitting sinusoidal uniform gratings. Optical Engineering 45 (2006) 015802, pp. 1-9 and L. B. Glebov, V. I. Smirnov, C. M. Stickley, I. V. Ciapurin. New approach to robust optics for HEL systems, Laser Weapons Technology III. W. E. Tompson and P. H. Merritt, Editors, Proceedings of SPIE, 4724 (2002) pp. 101-109 the Bragg condition is:

$$|\cos\theta_m^*| = \frac{\lambda_0 f}{2n_{av}} \tag{1}$$

where $\theta_m^*$ is the incident Bragg angle, $\lambda_0$—wavelength, f=1/d—spatial frequency of grating, $n_{av}$—average refractive index. According to Snell's law $$\sin\theta_i = n_{av}|\cos\theta_m^*| = f_N/2 \tag{2}$$

where $f_N = \lambda_0 f = \lambda_0/d$ is a normalized spatial frequency of a grating. In this case, the deflection angle is equal to:

$$2\theta_i = 2\arcsin\frac{f_N}{2} \tag{3}$$

Figure 6:
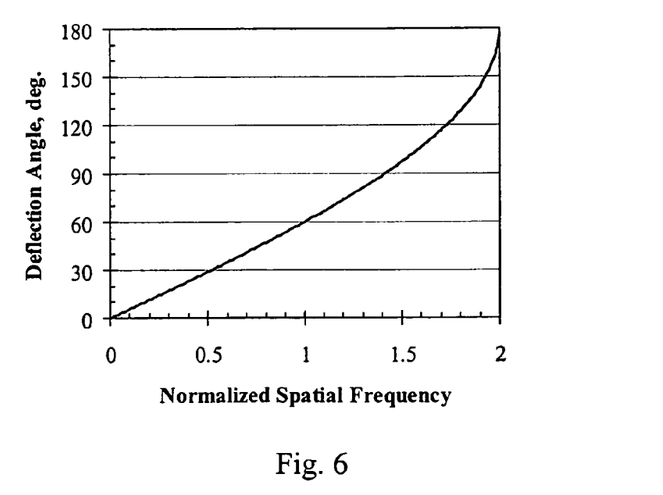
FIG. 6 shows dependence of deflection angle on normalized spatial frequency of Bragg gratings.

As shown by the graph in FIG. 6, the deflection angle depends approximately linearly on the spatial frequency for gratings with low spatial frequencies. Fast increasing of a deflection angle at high frequencies results from approaching the angle of total internal reflection for the beams propagating in the medium. However, for a normalized spatial frequency of approximately 1.415 (grating period—0.7$\lambda_0$), the deflection angle reaches approximately 90° which means that the total field of view of such a device reaches approximately 180°. Thus, easily achievable deflection angles are ranged from a few degrees to more than approximately 90 degrees.

The general formula for angular selectivity, the dependence of diffraction efficiency $\eta$ on deviation from the Bragg angle in a medium $\Delta\theta_m$, is rather cumbersome but can be simplified for a symmetric transmitting grating having 100% diffraction efficiency:

$$\eta = \frac{\sin^2\left[\frac{\pi}{2}\left(1 + \frac{f_N^2(4n_{av}^2 - f_N^2)\Delta\theta_m^{*2}}{4\delta n^2 n_{av}^2}\right)^{1/2}\right]}{1 + \frac{f_N^2(4n_{av}^2 - f_N^2)\Delta\theta_m^{*2}}{a\delta n^2 n_{av}^2}} \tag{4}$$

Figure 7:
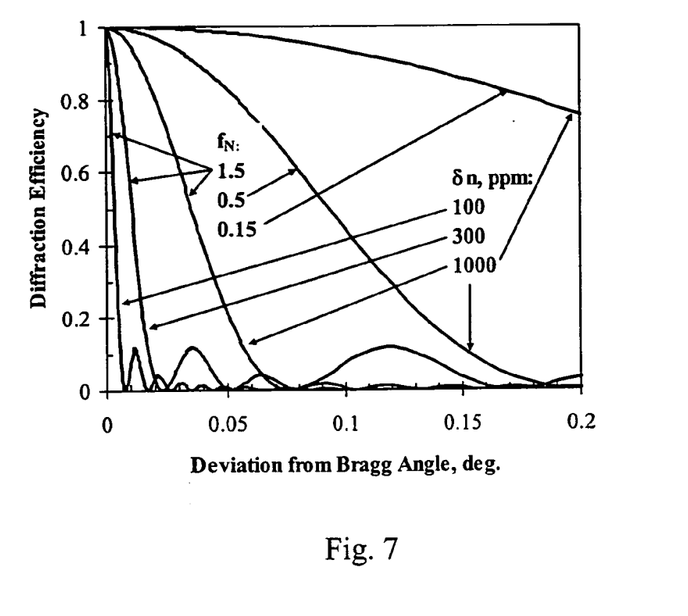
FIG. 7 is a graph showing angular selectivity of transmitting Bragg gratings.

The dependence of diffraction efficiency on deviation from the Bragg angle, the angular selectivity in the azimuthal plane, for a transmitting Bragg grating having optimal thickness is shown in FIG. 7 for different values of spatial frequency and refractive index modulation. As shown, deviation from a Bragg condition which corresponds to the first zero of angular selectivity is ranged from below approximately 0.01° to about approximately 1°. The position of the first zero at the angular selectivity curve is:

$$\delta\theta_i^{HWFZ} = \frac{2\sqrt{3}\,\delta nn_{av}}{f_N(4-f_N^2)^{1/2}} \qquad (5)$$

The angular magnification which is a ratio of a deflection angle to angular selectivity is calculated from equation 3 and equation 5:

$$M = \frac{2\theta_i}{\delta\theta_i^{HWFZ}} = \frac{f_N(4-f_N)^{1/2}arcsin\frac{f_N}{2}}{\sqrt{3}\,\delta nn_{av}} \qquad (6)$$

Figure 8:
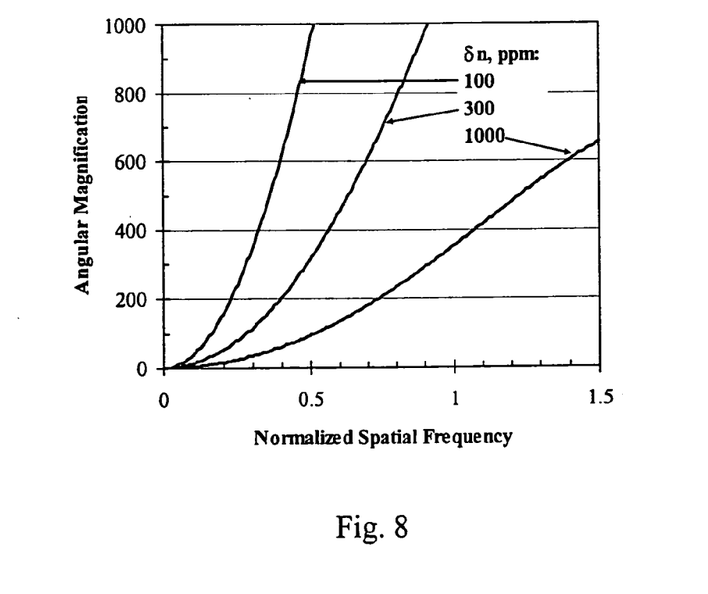
FIG. 8 is a graph showing dependence of angular magnification by transmitting Bragg grating.

The dependence of magnification on spatial frequency for different values of refractive index modulation, the different thickness of gratings, is shown in FIG. 8. As shown, angular magnification by transmitting Bragg gratings can be observed up to several thousands within achievable parameters for PTR gratings.

Figure 9:
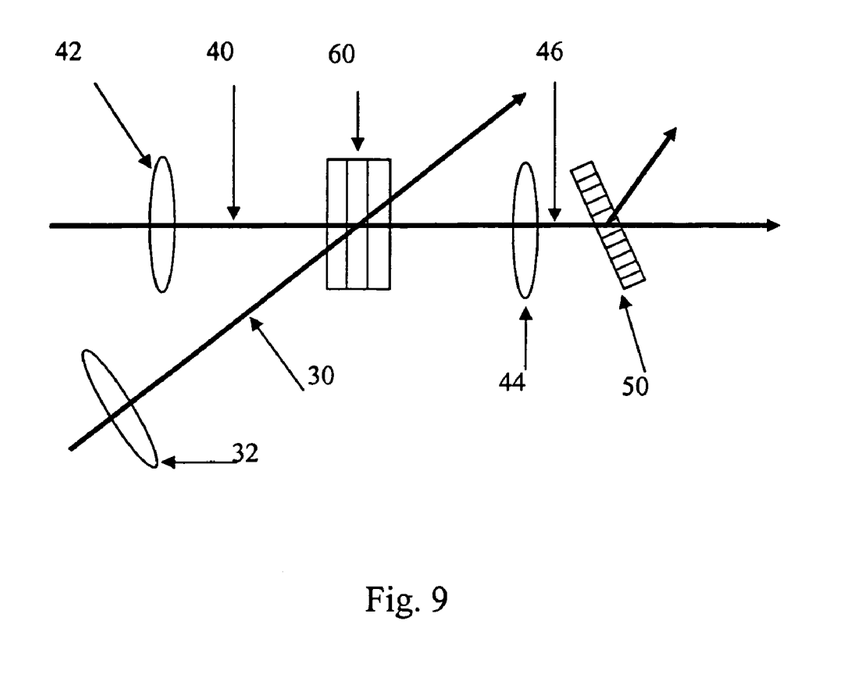
FIG. 9 shows an experimental setup for demonstration of beam deflection by optically controlled LC spatial light modulator with angular magnification by PTR Bragg gratings.
Figure 10A:
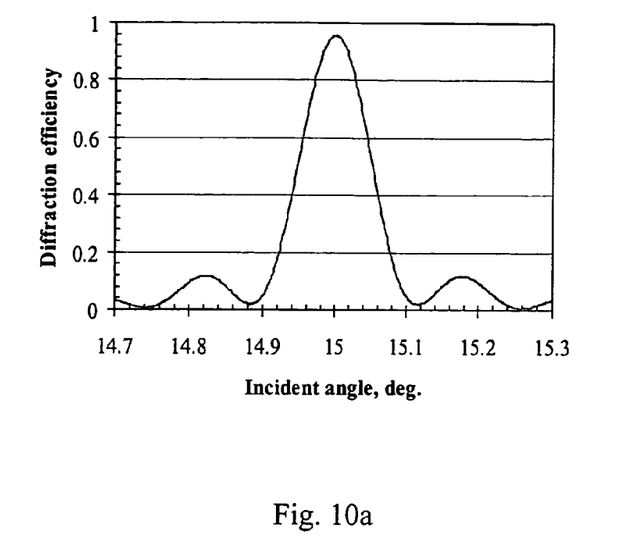
FIG. 10a is a graph showing angular selectively of PTR Bragg gratings.
Figure 10B:
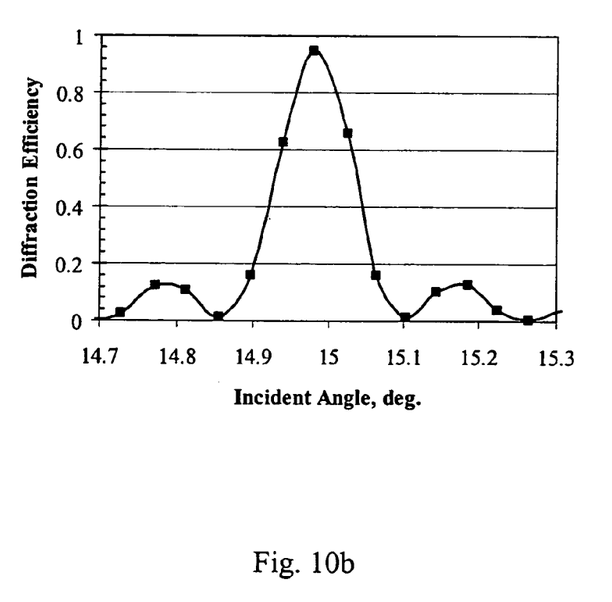
FIG. 10b is another graph showing angular selectively of PTR Bragg gratings.

The system configuration shown in FIG. 9 is used to verify the present invention for angular magnification using the same liquid crystal cell 35 shown in FIG. 3. To adjust divergence of the controlled beam 40 and the angular selectivity of PTR Bragg grating, the second collimator 44 is placed in the controlled beam 40 after the optically controlled liquid crystal spatial light modulator 60 (OCLC SLM). The collimated controlled beam 46 is directed to the PTR Bragg gratings 50 such that the incidence angle corresponds to the first zero in the diffraction efficiency curve shown in FIGS. 10a and 10b. Therefore, the collimated controlled beam 46 is not diffracted.

Figure 11:
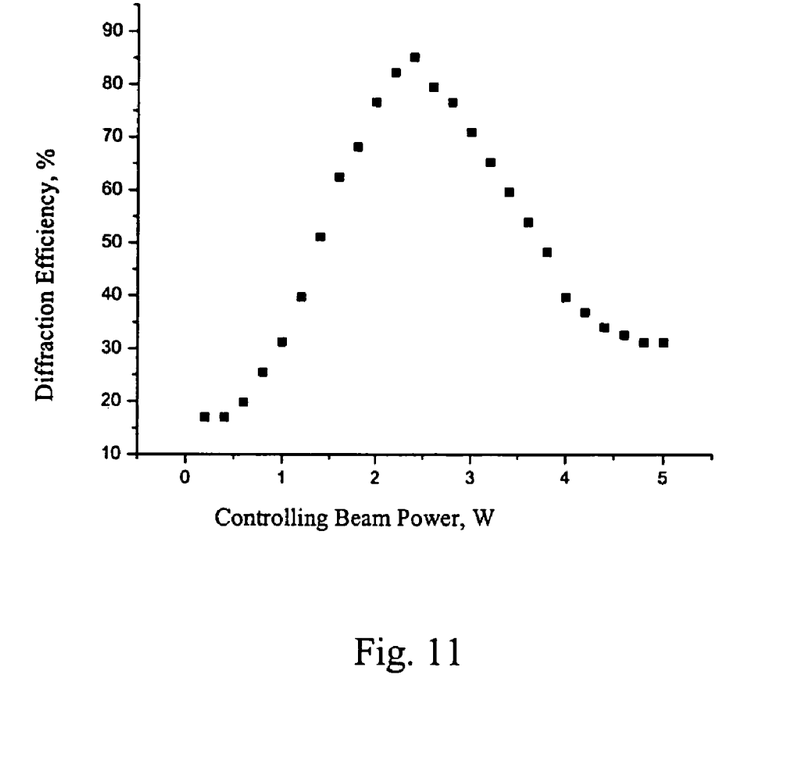
FIG. 11 is a graph showing the dependence of efficiency of an angular magnifier on power of a controlling beam.

Then the intensity of the controlling beam 30 is gradually increased and a gradual deflection of the controlled beam 40 is observed. However, when the deflection angle of the controlled beam 40 approaches the angular selectivity of the PTR Bragg grating 50, distance between maximum and the first zero in a diffraction efficiency curve which is approximately 0.1°, the deflection angle of the controlled beam step-wise changed from parts of degree to approximately 30° according to the spatial frequency of the PTR Bragg grating. The dependence of efficiency of large angle deflection versus power of the controlling beam is shown in the graph of FIG. 11. As shown, this example resulted in approximately 90% efficiency of angular magnification which is approximately 50× in this case.

The apparatus, methods, systems and devices of the present invention can be used for switching in optical interconnectors, multichannel laser systems, beam scanners, pointers, target trackers, etc. Switching to fixed angles is possible using a pair of OCLC SLM and a PTR Bragg grating, while fine steering for large angles is possible by means of three consequent elements—optically controlled liquid crystal spatial light modulators/volume Bragg gratings/optically controlled liquid crystal spatial light modulators (OCLC SLM/VBG/OCLC SLM). A stack of volume Bragg Gratings provides switching to a number of fixed angles. Two consequent devices provide two-dimensional scanning along azimuth and elevation.

The example shown in FIG. 9 through FIG. 11 describes an optically controlled liquid crystal spatial light modulator which is a conventional prism with one dimensional gradient of refractive index. Modifications of distribution of power density across an aperture of a controlling beam results in creation of a number of different optical elements, e.g. prism array, lens, lens array, Fresnel prism, Fresnel lens, diffractive grating with variable period etc. The combination of these elements with angular selection and magnification by volume Bragg gratings results in different distributions of diffracted beams in near and far fields and, therefore, can be used for different types of image and optical signal processing.

Profiling of the power density of a controlling beam is accomplished by the use of amplitude and phase masks or by a combination of two or more coherent beams to produce interference patterns of desirable profile. The last one can be considered as a low-spatial-frequency hologram which can be magnified along one axes.

Another embodiment of a combination of OCLC SLM and VBG is a creation of a tunable phase plate for aberration compensation or fine tuning of phase retardation in optical systems. In this device a stationary part of phase compensation is provided by PTR phase plate which is feasible because this holographic material provides photosensitivity down to approximately zero spatial frequency. The variable part of phase compensation is provided by means of OCLC SLM.

A consequent use of two (or more) controlling beams can provide a dramatic increase in the rate of switching because photoinduced re-orientation of LC can be produced by orders of magnitude faster compared to natural relaxation of LC.

In summary, optically controlled liquid crystal spatial light modulators have several distinct advantages compared to electrically controlled liquid crystal spatial light modulators (LC SLM). The photosensitivity and phase modulating functions are integrated into a single layer of a LC-material in OCLC SLM. The resulting apparatus is produced for a fraction of the cost to produce a conventional LC-SLM and can be used with high power laser radiation because of the high transparency of LC materials and the absence of light absorbing electrodes on the substrates of the LC-cell constituting the OCLC SLM. In contrast, electrically controlled LC SLM are complex multi-layer systems where an electric field provided by an external power supply modulates the optical axis direction of a thin layer of a LC according to the intensity pattern of the light propagating through it.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical device comprising:
an optically controlled liquid crystal spatial light modulator;
a first laser source for providing a controlled beam that is focused at the optically controlled liquid crystal spatial light modulator;
a second laser source for providing a controlling beam at a controlling wavelength;
a lens for aligning the controlling beam having a controlling wavelength in an area of highest gradient power density of the controlling beam on the optically controlled liquid crystal spatial light modulator, wherein an e-component of the controlled beam is deflected by a gradient refractive index and birefringence induced by the controlling beam to provide optically controlled beam switching for laser beam control;

a collimator for collimating the controlled beam after the controlled beam passes through the optically controlled liquid crystal spatial light modulator; and a volume Bragg grating recorded in a photosensitive PTR glass for angular magnification of the collimated controlled beam to decrease a switching time, wherein the collimated controlled beam is directed to the volume Bragg grating so that the collimated controlled beam is not diffracted.

2. The device of claim 1, wherein the volume Bragg grating comprises:

a stack of volume Bragg gratings for switching the collimated controlled beam to a number of fixed angles.

3. A system for optical beam steering and switching comprising:

an optically controlled liquid crystal spatial light modulator;

a first laser source for providing a controlled beam that is focused at the optically controlled liquid crystal spatial light modulator;

a second laser source for providing a controlling beam;

a lens for aligning the controlling beam in an area of highest gradient power density of the controlling beam on the optically controlled liquid crystal spatial light modulator for optically controlled optical beam steering and switching;

a collimator for collimating the controlled beam after the controlled beam passes through the optically controlled liquid crystal spatial light modulator; and a volume Bragg grating recorded in a photosensitive PTR glass for angular magnification of the collimated controlled beam for large angle beam deflection to provide the optical beam steering and switching.

4. The system of claim 3, wherein the optically controlled spatial light modulator comprises:

a liquid crystal layer sandwiched between a first and a second substrate, wherein an e-component of the controlled beam is deflected by a gradient refractive index and birefringence induced by the controlling beam, wherein photosensitivity and phase modulating functions are integrated into a liquid crystal material in the optically controlled liquid crystal spatial light modulator.

5. The system of claim 3, further comprising:

a second optically controlled liquid crystal spatial light modulator; and a second Bragg grating in a PTR glass for switching to fixed angles, wherein the system is used for switching to fixed angles.

6. The system of claim 4, further comprising:

a second liquid crystal layer sandwiched between a third and a fourth substrate for fine tuning of the beam position.

7. The system of claim 3, further comprising:

a PTR phase plate as a holographic material to provide a photosensitivity down to approximately zero spatial frequency for a stationary part of phase compensation, wherein the optically controlled liquid crystal modulator provides a variable part of phase compensation to create a tunable phase plate for aberration compensation and fine tuning of phase retardation in an optical system.

8. A method comprising the steps of:

focusing a controlled laser beam on a liquid crystal layer sandwiched between a first and a second substrate;

focusing an area of highest gradient power density of a controlling beam at a controlling wavelength on the liquid crystal layer, wherein a gradient refractive index and birefringence induced by the controlling beam causes a deflection of an e-component of the controlled beam;

using a Bragg grating recorded in a photosensitive PTR glass for angular magnification of the controlled beam for large angle beam deflection; and adjusting an angular selectivity for small angle scanning to produce a change of diffraction efficiency from zero to approximately 100%.

9. The method of claim 8, further comprising the step of:

focusing the controlled beam on the liquid crystal layer with a lens.

10. The method of claim 8, further comprising the step of:

controlling a power of the controlling beam to control a deflection angle of the e-component of the controlled beam.

11. The method of claim 8, further comprising the step of:

placing a collimator in the controlled beam after the controlled beam passes through the liquid crystal layer to adjust divergence of the controlled beam.

12. The method of claim 11, further comprising the step of:

optical beam switching in optical connectors.

13. The method of claim 11, further comprising the step of:

optical beam switching in multi-channel laser systems.

14. The method of claim 11, further comprising the step of:

optical beam switching in one of a beam scanner, pointer, and a target tracker.

15. The method of claim 11, further comprising:

creating a tunable phase plate for aberration compensation or fine tuning of phase retardation in optical systems, wherein a stationary part of phase compensation is provided by a PTR phase plate which is feasible because this holographic material provides photosensitivity down to zero spatial frequency and a variable part of phase compensation is provided by means of the liquid crystal layer.

16. The method of claim 8, further comprising the step of:

modifying a distribution of power density across an aperture of the controlling beam to create an optical elements selected from a group comprising a prism array, lens, lens array, Fresnel prism, Fresnel lens, and a diffractive grating with variable period.

17. The method of claim 16, further comprising the step of:

using a Bragg grating recorded in a photosensitive PTR glass for angular magnification of the controlled beam for large angle beam deflection; and combining one of the optical elements with angular magnification by the volume Bragg grating for distributions of diffracted beams in near and far fields for use in image and optical signal processing.

18. The method of claim 16, further comprising the step of:

using one of an amplitude, a phase masks and a combination of at least two coherent beams to produce an interference pattern of having a preselected profile.

* * * * *

UNITED STATES PATENT AND TRADEMARK OFFICE
CERTIFICATE OF CORRECTION

| | | |
|---|---|---|
| PATENT NO. | : 7,324,286 B1 | Page 1 of 1 |
| APPLICATION NO. | : 11/399166 | |
| DATED | : January 29, 2008 | |
| INVENTOR(S) | : Leonid B. Glebov et al. | |

It is certified that error appears in the above-identified patent and that said Letters Patent is hereby corrected as shown below:

Column 1, line 22 insert

--STATEMENT REGARDING FEDERALLY SPONSORED RESEARCH OR DEVELOPMENT

This invention was funded in part by DoD contracts F33615-02-C-1250 (DARPA) and HR-01-1041-0004 (DARPA), DoD contract W31P4Q-04-C-R157 (DARPA) and DoD contract W31P4Q-04-C-R026 (DARPA).--

Signed and Sealed this

Twenty-fourth Day of August, 2010

David J. Kappos
*Director of the United States Patent and Trademark Office*